2 Sheets--Sheet 1.

G. J. OVERSHINER.
Gang-Plows.

No. 151,425. Patented May 26, 1874.

Witnesses.
Alf Eaten
Thos. M. Davis

Inventor
Gideon Jackson Overshiner

2 Sheets--Sheet 2.

G. J. OVERSHINER.
Gang-Plows.

No. 151,425. Patented May 26, 1874.

Witnesses.
Cef. Eaten
Thos. M. Davis

Inventor.
Gideon Jackson Overshiner

UNITED STATES PATENT OFFICE.

GIDEON J. OVERSHINER, OF HOLLISTER, CALIFORNIA.

IMPROVEMENT IN GANG-PLOWS.

Specification forming part of Letters Patent No. 151,425, dated May 26, 1874; application filed April 16, 1873.

*To all whom it may concern:*

Be it known that I, GIDEON JACKSON OVERSHINER, of the town of Hollister, in the county of Monterey and State of California, have invented certain Improvements in the Gang-Plow, of which the following is a specification:

My invention relates to the combination and application of spring and lever power to the gang-plow in such manner that the plows may be raised by the foot of the driver, and with the application of very little power.

Figure 1:
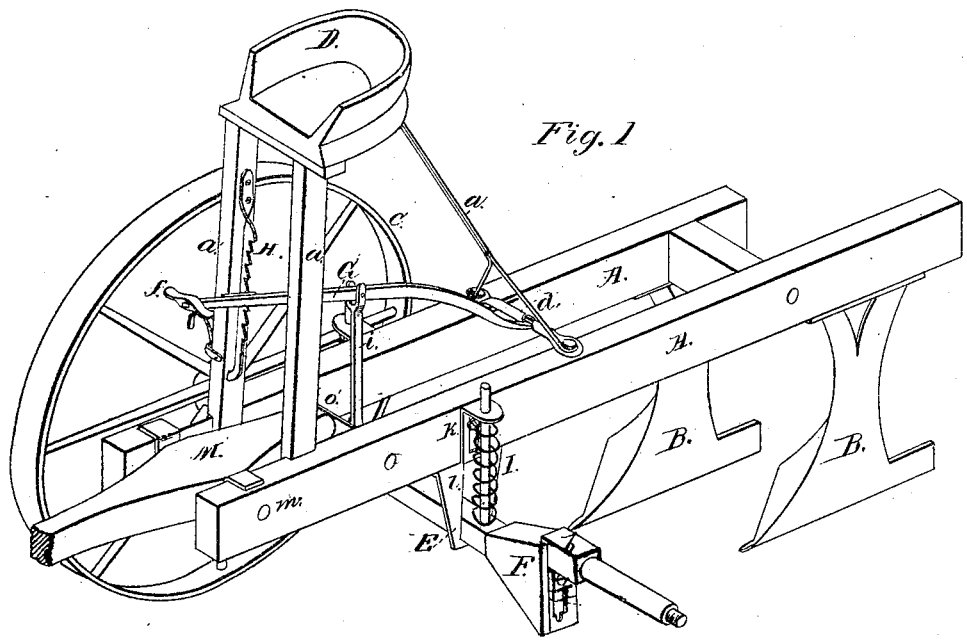
Figure 2:
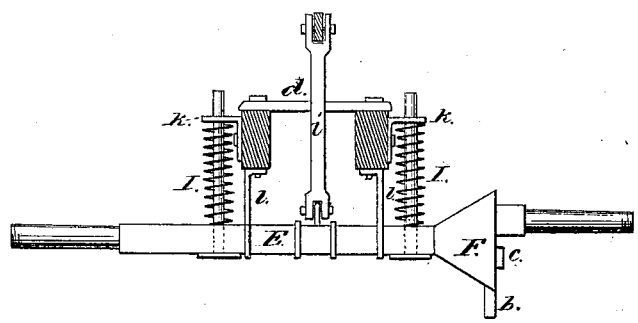
Figure 3:
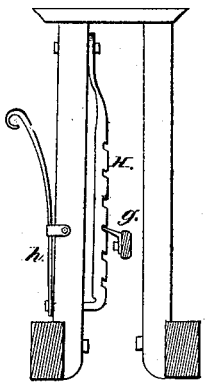

Figure 1 is a perspective view of the plow embodying my invention. Fig. 2 is a transverse section of the axle. Fig. 3 is the spring and lever gear.

A A in Fig. 1 is the frame, which is made of some durable material, and of form now in common use. B B are the plows attached to the rear end of the frame, and may be made in such form as may best suit the soil plowed. C are the wheels, (one only being shown,) both of which are made of substantial material and usual form. D is the seat of the driver, placed above the frame, and supported by upright supports, marked *a a a*. E in Figs. 1 and 2 is the axle, made of iron, one end of which is of usual shape as made for vehicles. The other end terminates in a casting or block, marked F. The block contains an upright groove, in which slides, either up or down, the axle-crank *b*, in Figs. 1 and 2. The crank is held firmly to the place required by means of a nut, marked *c*, Fig. 2, which screws upon the end of the axle passing through the crank-block, and through a long opening in the arm of the axle-crank, which moves in said groove. The crank can be adjusted and held at such distance above or below a line of the axle as may be required. G is the lever, one end of which is attached to a cross-bar, marked, in Figs. 1 and 2, *d*, on top of the frame, and about in the center between the two parts of the frame. From this point the lever extends forward between the seat-supports, and of sufficient distance to be readily reached by the foot of the driver. At this end of the lever is attached a foot-bar, of such shape as to hold the foot in place while pressing thereon, and marked *f* in Fig. 1. H in Figs. 1 and 3 represents a notched spring fastened to the right seat-support in such manner as to catch and hold in place the lever by means of a catch thereon, *g* in Fig. 3. The spring passes through the support at its lower end, and is worked by means of a small lever, *h*, in Fig. 3, by which the catch is displaced. To the lever G is attached a fulcrum, *i*, Figs. 1 and 2, which is an iron rod passing from the lever to the axle, and attached thereto by a clip-band, said fulcrum being placed and worked in a perpendicular position, or as near as may be. I I, Figs. 1 and 2, are spiral springs coiled around upright rods fastened to the axle by clip-bands, and placed immediately on either side of the frame, outside thereof. On the top of the springs are fastened plates, marked K, Figs. 1 and 2, through which the coil-rod passes. This plate is also fastened to the outside of the frame, near the top, and so adjusted, by slide-openings in same, with rod and nut, that the plate may be raised or lowered, and the springs thus extended, or compressed, or lowered, the springs being made of steel. The axle passes through loops *l l*, Figs. 1 and 2, which are fastened to the bottom of the frames, extending downward, and so made as to permit the axle to move upward or downward about six inches, and from one side to the other when permitted, but not backward or forward. M, Fig. 1, is the pole, which is attached to the front end of the frame by a bolt passing through the pole and ends of the frame *m*, Fig. 1, the pole passing between the frames, and beyond the point of attachment, and to a distance of about eighteen inches. This end of the pole decreases in width from the point of attachment, and terminates in a small square iron projection, *o*, (see Fig. 1,) which moves in an opening in a cross-plate, and, by means of a nut on the end of the projection, is held fast to the plate, so that the pole is held straight with the plow, or turned to one side, having only a horizontal motion. The cross-plate P is fastened to the frames, between the same, by means of bolts and nuts, and slots in the plates in the parts attached to the frame, and may be raised or lowered, thus raising the outer end of the pole.

Having thus described my invention, what I claim as new, and desire to secure by Letters Patent, is—

In a gang-plow, the combination of the springs I I and lever G, for lifting the frame A and plows B, constructed and operating substantially as set forth.

Hollister, April 5, 1873.

GIDEON JACKSON OVERSHINER.

Witnesses:
ALEX. EATON,
THOS. M. DAVIS.